United States Patent
Kim

(10) Patent No.: US 7,134,126 B2
(45) Date of Patent: Nov. 7, 2006

(54) APPARATUS AND METHOD FOR REDUCING PROGRAM SELECTION TIME IN MULTI-CHANGER OF OPTICAL DISK PLAYER

(75) Inventor: Jong-bum Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 483 days.

(21) Appl. No.: 10/441,263

(22) Filed: May 20, 2003

(65) Prior Publication Data
US 2004/0013055 A1   Jan. 22, 2004

(30) Foreign Application Priority Data
Jul. 16, 2002   (KR) .............. 2002-41583

(51) Int. Cl.
*G11B 17/03*   (2006.01)
*G11B 21/08*   (2006.01)

(52) U.S. Cl. .......... 720/604; 720/626; 369/30.33; 369/30.27; 369/53.41

(58) Field of Classification Search ............ None
See application file for complete search history.

(56) References Cited

U.S. PATENT DOCUMENTS

| | | | | |
|---|---|---|---|---|
| 5,684,773 A * | 11/1997 | Hayashi | ............ | 369/47.35 |
| 5,963,523 A * | 10/1999 | Kayama et al. | ............ | 369/53.22 |
| 6,111,832 A * | 8/2000 | Tsuchiya et al. | ............ | 369/53.23 |
| 6,201,774 B1 * | 3/2001 | Oh et al. | ............ | 369/44.27 |
| 6,249,499 B1 * | 6/2001 | Andoh | ............ | 369/53.22 |
| 6,493,304 B1 * | 12/2002 | Watanabe et al. | ............ | 369/53.22 |
| 6,556,302 B1 * | 4/2003 | Ishihara | ............ | 356/445 |
| 7,042,815 B1 * | 5/2006 | Kim | ............ | 369/30.79 |

FOREIGN PATENT DOCUMENTS

| JP | 06-324956 | 11/1994 |
|---|---|---|
| JP | 08-336668 | 12/1996 |
| JP | 3088108 | 6/2002 |

* cited by examiner

Primary Examiner—Tan Dinh
(74) Attorney, Agent, or Firm—Staas & Halsey LLP

(57) ABSTRACT

Provided are an apparatus and method of operating a multi-changer of an optical disc player which restricts an initial operation of the multi-changer of the optical disc by referring to a disc chucking and tray open/close states. According to the method, it is determined whether a type of a disc, which is currently mounted in the disc mounting unit, has been determined before, if a tray open or close key is inputted. If it is determined that the type of the disc has not been determined before, the tray is opened or closed. Then, if the tray is closed, the type of the disc is determined after chucking the disc which is currently mounted in the disc mounting unit. According to the method, it is possible to stabilize a player by restricting an initiating operation of the multi-changer of the optical disc, which occurs needlessly due to a tray open/close key, when a disc is not yet chucked.

8 Claims, 3 Drawing Sheets

APPARATUS AND METHOD FOR REDUCING PROGRAM SELECTION TIME IN MULTI-CHANGER OF OPTICAL DISK PLAYER

CROSS-REFERENCE TO RELATED APPLICATIONS

This application claims the benefit of Application No. 2002-41583, filed Jul. 16, 2002, in the Korean Intellectual Property Office, the disclosure of which is incorporated herein by reference.

BACKGROUND OF THE INVENTION

1. Field of the Invention

The present invention relates to an apparatus and method of operating a multi-changer of an optical disc player, and more particularly, to an apparatus and method of operating a multi-changer of an optical disc which restricts an initial operation of the multi-changer of the optical disc by disc chucking and tray open/close states.

2. Description of the Related Art

Generally, a disc multi-changer performs by stopping a spindle motor and initiating a servo chip and a pick-up using only open/close key values.

FIG. 1 is a flowchart of a conventional method for operating a multi-changer of an optical disc player. The conventional method determines whether a tray open/close key is inputted or not, and a tray open/close key flag is set to check a key input if the tray open/close key is inputted (operations 100 and 101). After the open/close key flag is set, a spindle motor is stopped to halt a disc which is being played at that time (operation 102). When the spindle motor is stopped, a flag initiating a pick-up is set (operation 103).

Then it is determined whether a pick-up initiation flag is set, and if the pick-up initiation flag is set, the pick-up is initiated by initiating a servo chip and actuating a sled motor to place the pick-up at a predetermined position (operations 104, 105 and 106).

After the pick-up is initiated, tray open/close operations are performed, i.e., the tray is opened and closed (operation 107).

After completion of the tray open/close operations, it is determined whether the disc is chucked (operation 108). If the disc is chucked, a type of the disc is determined, and the disc is played (operations 109 and 110).

Referring to FIG. 1, in order to perform the tray open/close operations when the open/close key is inputted from a remote control, the spindle motor is stopped, the servo chip is initiated, and the operations for initiating the pick-up are repeated. Here, the aforementioned operations are related to read or write data from or to the servo chip, and thus a delay in time is inevitable to safely read or write data. The delay in time affects the entire operations of a system and lengthens the overall delay in time. In addition, the servo chip initiation is to apply a hardware reset to the servo chip, where a set of servo coefficients is written to the servo chip if the servo chip initiation is performed. When the tray open/close key is repeatedly inputted, the servo chip is unnecessarily reset and the servo coefficients are written to the servo chip, and thus the servo chip operates from a busy state. Further, when the tray open/close key is repeatedly inputted, the pick-up, which has been already in the initiation position, is unnecessarily moved again. If the pick-up initiating operation is performed, a main micom processes a time interrupt to set the position of the pick-up. Here, if the tray open/close key is repeatedly inputted, the main micom is not properly capable of processing the time interrupt.

SUMMARY OF THE INVENTION

It is an aspect of the present invention to provide a method of operating a multi-changer of an optical disc player which stabilizes the player by restricting an initiating operation of the multi-changer, which occurs needlessly due to a tray open/close key, when a disc is not yet chucked.

It is another aspect of the present invention to provide an apparatus operating a multi-changer of an optical disc player which stabilizes the player by preventing an initiating operation of the multi-changer, which occurs needlessly due to a tray open/close key, when a disc is not yet chucked.

According to an aspect of the present invention, there is provided a method of operating a multi-changer of an optical disc player that includes a tray where a plurality of discs are mounted in a plurality of disc mounting units, the method comprising if a tray open or close key is inputted, determining whether a type of a disc, which is currently mounted in the disc mounting unit, has been determined before, if it is determined that the type of the disc has not been determined before, opening or closing the tray, and if the tray is closed, determining the type of the disc after chucking the disc which is currently mounted in the disc mounting unit.

The method further comprises, if the disc, which is currently mounted in the disc mounting unit, is chucked in the determining the type of the disc operation, determining the type of the disc after setting a flag for determining the type of the disc.

In another aspect, the determining whether the disk has been identified before operation can be performed using the flag for determining the type of the disc which is set in the determining the type of the disc operation.

In an additional aspect, the method further comprises, if the tray is being opened in the opening or closing the tray if the disc has not been determined before operation, resetting the flag for determining the type of the disc.

According to another aspect of the present invention, there is provided an apparatus for operating a multi-changer of an optical disc player, the apparatus comprising a tray where a plurality of discs are mounted in a plurality of disc mounting units, and a controlling device that, if a tray open or close key is inputted, determines whether a type of a disc, which is currently mounted in the disc mounting units, has been determined before, chucks the disc that is currently mounted in the disc mounting units, and determining the type of the disc, if the type of the disc has not been determined before and the tray is closed.

The controlling device resets a flag for determining the type of disc if the tray is being opened.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated from the following description of the preferred embodiments taken in conjunction with the accompanying drawings in which.

DETAILED DESCRIPTION OF THE PREFERRED EMBODIMENTS

Figure 1:
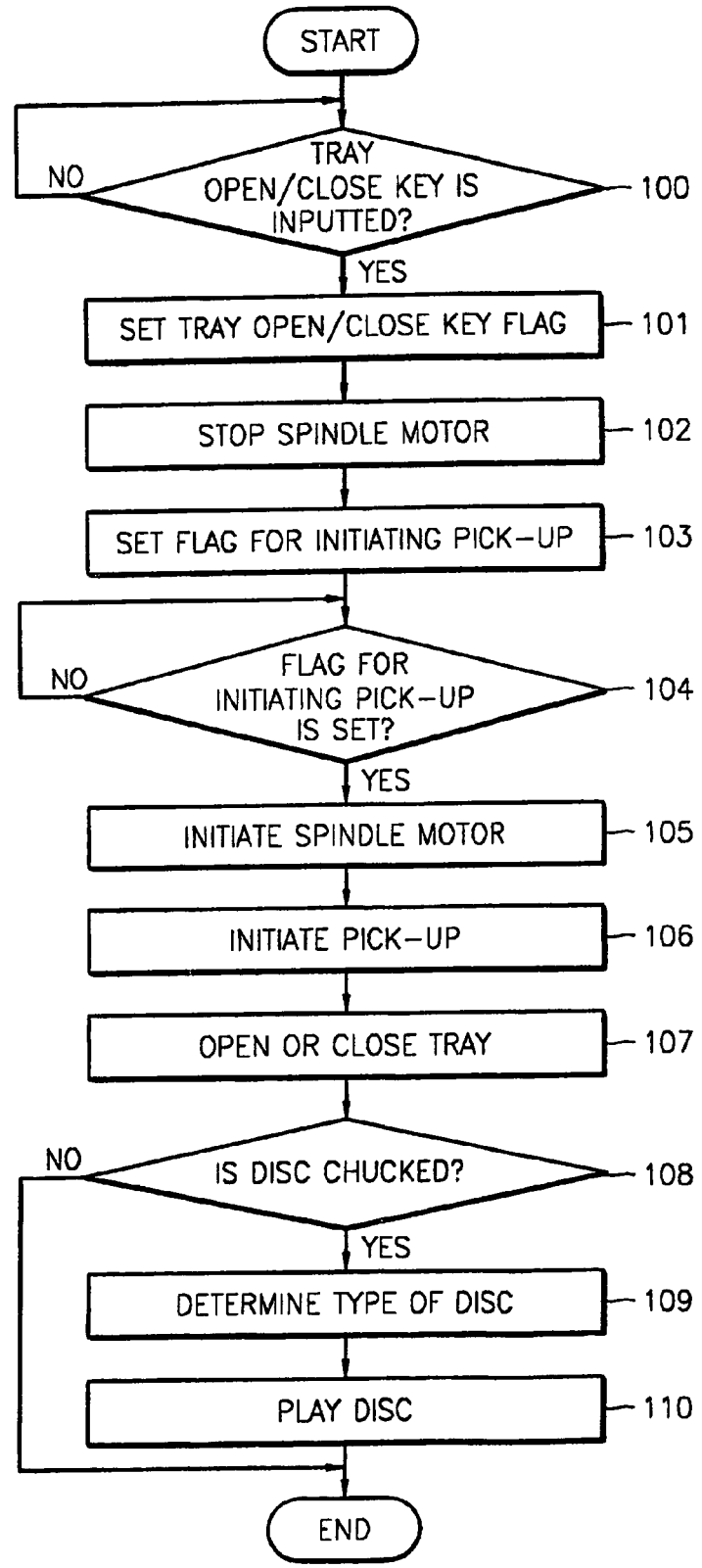
FIG. 1 is a flowchart of a conventional method for operating a multi-changer of an optical disc player.

The present invention will now be described more fully with reference to the accompanying drawings, in which embodiments of the invention are shown. Like reference numerals refer to like elements throughout.

Figure 2:
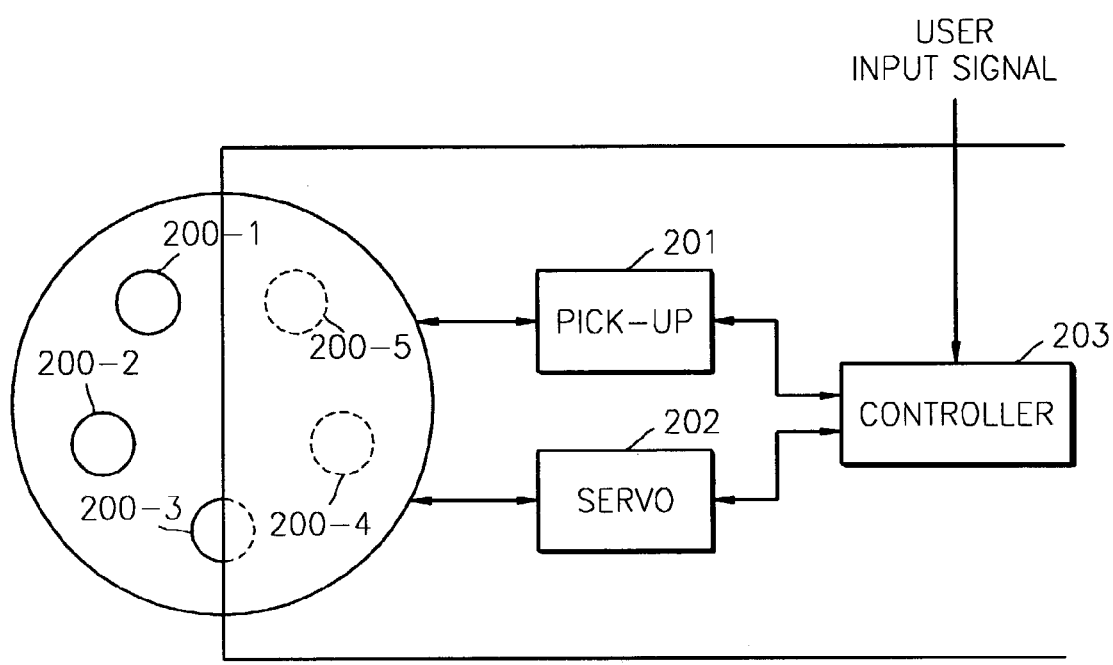
FIG. 2 is a block diagram of a structure of an apparatus operating a multi-changer of an optical disc player, according to an embodiment of the present invention.

FIG. 2 is a block diagram of a structure of an apparatus which reduces a program selection time in a multi-changer of an optical disc player according to an embodiment of the present invention. The apparatus includes a tray 200 having first through fifth disc mounting units 200-1 through 200-5, a pick-up 201, a servo 202, and a control unit 203.

Figure 3:
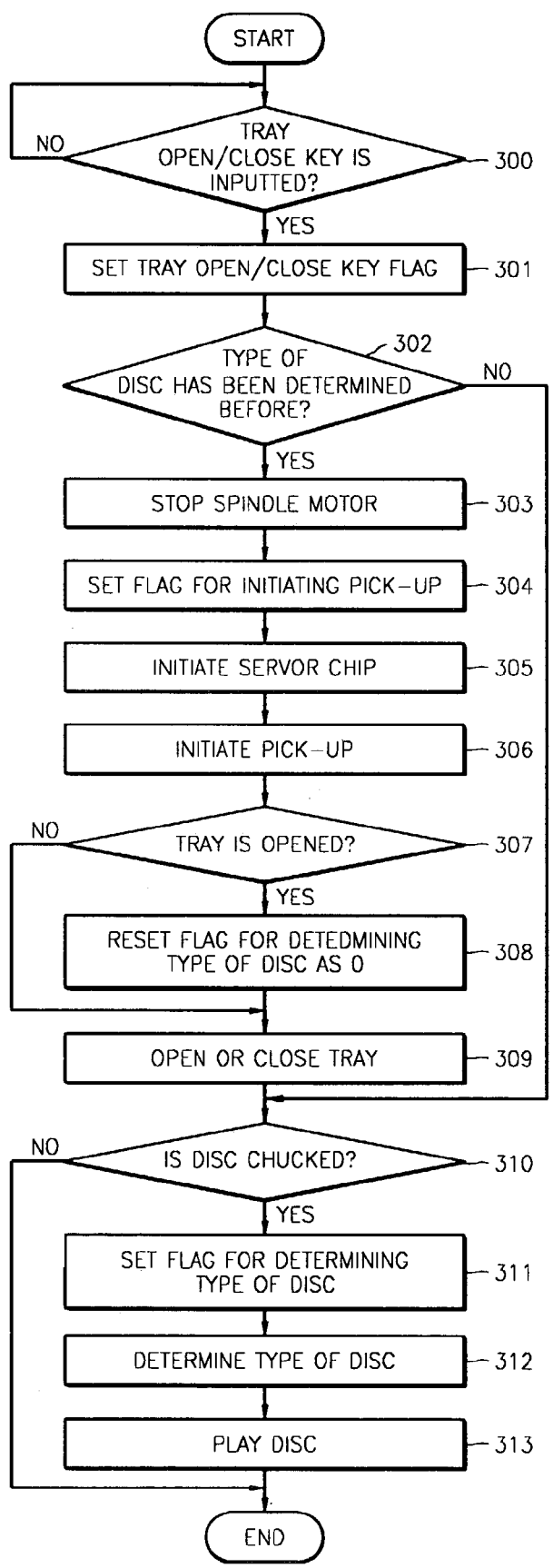
FIG. 3 is a flowchart of a method operating the multi-changer of the optical disc player, according to an embodiment of the present invention.

FIG. 3 is a flowchart showing a method of operating the multi-changer of the optical disc player according to an embodiment of the present invention. Referring to FIG. 3, it is determined whether a tray open/close key is inputted in operation 300. Then, a tray open/close key flag is set in operation 301, and it is determined whether a type of a disc has been determined before in operation 302. Then, a spindle motor is stopped in operation 303, and a pick-up initiation flag is set in operation 304. The servo chip is initiated in operation 305, and the pick-up is initiated in operation 306. Then, it is determined whether the tray is opened in operation 307, and a flag for determining the type of the disc is reset to 0 in operation 308. In operation 309, the tray open/close operation is performed. In operation 310, it is determined whether the disc is chucked. Then, the flag for determining the type of the disc is set in operation 311, and the type of disc is determined in operation 312. In operation 313, the disc is played.

Hereinafter, the present invention will be described with reference to FIGS. 2 and 3 in more detail.

The controller 203 determines whether the tray open/close key is inputted by a remote controller (not shown) (operation 300). A signal inputted by the remote controller is a user input signal in FIG. 2.

After the controller 203 receives the tray open/close key, a tray open/close key flag is set (operation 301). This is because it is necessary to confirm that the multi-changer of the optical disc player is currently inputting keys.

After the tray open/close key flag is set, the controller 203 determines whether a type of the disc, which is currently mounted in the disc mounting unit 200-1 (the disc mounting unit 200-1 is selected at random, and thus it may be one of 200-1 through 200-5), has been determined before (operation 302). Operation 302 may be performed by determining whether a flag determining the type of disc has been set.

If the type of disc, which is mounted in the disc mounting unit 200-1, has not been determined before, the controller 203 determines whether the disc is chucked in order to determine the type of disc, without stopping the spindle motor, initiates the servo chip and performs the pick-up initiating operations (operation 310). Here, chucking of the disc means the disc is safely fixed on the rotating spindle motor. After the disc is chucked, the controller 203 sets the flag determining the type of the disc and determines the type of the disc (operations 311 and 312). The multi-changer in the present invention has also at least two disc mounting units in which a digital video disc, a compact disc, and other kinds of discs can be mounted, and thus the controller 203 is required to determine the type of the disc which is currently mounted in the disc mounting unit 200-1. After the type of the disc is determined, the disc is played (operation 313).

If the type of the disc, which is mounted in the disc mounting unit 200-1, has been determined before, the controller 203 stops the spindle motor to halt the disc which is being played (operation 303). The servo 202 includes the spindle motor which rotates the disc and a sled motor which moves a pick-up 201.

When the spindle motor is stopped, the controller 203 sets a flag initiating the pick-up 201 (operation 304).

If the method determines that the flag initiating the pick-up 201 is set, the controller 203 performs initiating operations for the servo 202 chip, i.e., a hardware reset is applied to the servo 202 chip for a set of servo coefficients to be written in the servo 202 chip (operation 305).

After completion of the initiating operations for the servo 202 chip, the controller 203 performs an initiating operation of the pick-up 201 (operation 306) by actuating the sled motor to move the pick-up 201 to a predetermined position.

After stopping of the spindle motor, and the initiating operations of the servo chip and the pick-up have been completed, the controller 203 determines whether the tray 200 is being opened (operation 307) to prevent the multi-changer from initiating the pick-up 201 without opening the tray 200. Actually, the multi-changer sometimes performs initiating operations without opening a tray.

If the tray 200 is being opened, the controller 203 resets the flag determining the type of the disc as 0 (operation 309).

When the flag determining the type of the disc is reset to 0, the controller 203 performs the tray open/close operation (operation 309).

After the tray open/close operation is performed, it is determined whether the disc, which is mounted in the disc mounting unit 200-1, is chucked (operation 310).

If the disc is chucked, the controller 203 sets the flag determining the type of the disc and determines the type of the disc (operations 311 and 312). In one implementation, the multi-changer has at least two disc mounting units in which a digital video, a compact disc, and other kinds of discs can be mounted, and thus the controller 203 is required to determine the type of the disc which is currently mounted in the disc mounting unit 200-1.

After the type of disc is determined, the disc is played (operation 313).

According to an embodiment of the present invention, it is possible to stabilize the player by restricting an initiating operation of the multi-changer of the optical disc player, which occurs needlessly due to a tray open/close key, when a disc is not yet chucked.

While this invention has been particularly shown and described with reference to preferred embodiments thereof, it will be understood by those skilled in the art that various changes in form and details may be made therein without departing from the spirit and scope of the invention as defined by the appended claims and equivalents.

What is claimed is:

1. A method of operating a multi-changer of an optical disc player that includes a tray where a plurality of discs are mountable in a plurality of disc mounting units, the method comprising:

if a tray open or close key is inputted, determining whether a type of one of the discs, which is currently mounted in one of the disc mounting units, has been determined before;

if determined that the type of one of the discs has not been determined before, opening or closing the tray; and if the tray is closed, determining the type of once of the discs after chucking the disc which is currently mounted in one of the disc mounting units.

2. The method of claim 1, wherein the method further comprises, if one of the discs, which is currently mounted in one of the disc mounting units, is chucked, determining the type of the disc after setting a flag for determining the type of one of the discs.

3. The method of claim 2, wherein the determining whether the type of one of the discs has been determined before is performed using the flag determining the type of the disc.

4. The method of claim 2, wherein the method further comprises, if the tray is being opened, resetting the flag determining the type of the disc.

5. An apparatus operating a multi-changer of an optical disc player, the apparatus comprising:

a tray where a plurality of discs are mountable in a plurality of disc mounting units; and a controlling device that, if a tray open or close key is inputted, determines whether a type of each disc, which is currently mounted in the corresponding disc mounting unit has been determined before, chucks each disc that is currently mounted in the corresponding disc mounting unit, and determines the type of each disc, if the type of the disc has not been determined before and the tray is closed.

6. The apparatus of claim 5, wherein the controlling device resets a flag determining the type of disc if the tray is being opened.

7. An apparatus operating a multi-changer of an optical disc player, the apparatus comprising:

a tray having a disc mounting unit; and a controlling device that, if a tray open or close key is inputted, determines whether a disc mounted in the disc mounting unit has been determined before, chucks the disc, and determines the type of the disc if the type of the disc has not been determined before and the tray is closed.

8. A method of operating an optical disc player having a multi-changer that includes a tray with a disc mounting unit, comprising:

detecting input of a tray open/close key;

determining whether a type of a disc mounted in the disc mounting unit was identified when the tray open/close key is inputted;

chucking the disc if the tray is closed; and identifying the type of the disc if the disc is chucked and the disc was not previously identified.

* * * * *